(12) United States Patent
Kang

(10) Patent No.: US 6,417,850 B1
(45) Date of Patent: Jul. 9, 2002

(54) DEPTH PAINTING FOR 3-D RENDERING APPLICATIONS

(75) Inventor: Sing Bing Kang, Arlington, MA (US)

(73) Assignee: Compaq Information Technologies Group, L.P., Houston, TX (US)

(*) Notice: Subject to any disclaimer, the term of this patent is extended or adjusted under 35 U.S.C. 154(b) by 0 days.

(21) Appl. No.: 09/238,250

(22) Filed: Jan. 27, 1999

(51) Int. Cl.[7] .............................................. G06T 15/40

(52) U.S. Cl. ...................................................... 345/422

(58) Field of Search ................................ 345/422, 421, 345/419, 427, 440, 441, 619; 382/154

(56) References Cited

U.S. PATENT DOCUMENTS

| | | | | |
|---|---|---|---|---|
| 5,801,717 A | * | 9/1998 | Engstrom et al. | 345/422 |
| 5,914,721 A | * | 6/1999 | Lim | 345/421 |
| 6,005,967 A | * | 12/1999 | Nakagawa et al. | 382/154 |
| 6,057,847 A | * | 5/2000 | Jenkins | 345/422 |
| 6,111,582 A | * | 8/2000 | Jenkins | 345/421 |

OTHER PUBLICATIONS

Heeger, D.J., and Bergen, J.R., "Pyramid–Based Texture Analysis/Synthesis," *Computer Graphics*, pp. 229–238 (Aug. 1995).

Horry, Y., et al., "Tour into the Picture: Using a Spidery Mesh Interface to Make Animation from a Single Image," *Computer Graphics* (SIGGRAPH '97), pp. 225–232 (Aug. 1997).

McMillan, L., and Bisop, G., "Plenoptic Modeling: An Image–Based Rendering System," *Computer Graphics* (SIGGRAPH '95), pp. 39–46 (Aug. 1995).

Mortensen, E.N., and Barrett, W.A., "Intelligent Scissors for Image Composition,", *Computer Graphics* (SIGGRAPH '95), pp. 191–198 (Aug. 1995).

Shade, J., et al., "Layered Depth Images," *Computer Graphics* (SIGGRAPH '98), pp. 231–242 (Jul. 1998).

Taylor,C.J.,et al., "Reconstructing Polyhedral Models of Architectural Scenes from Photographs,", *In Fourth European Conference on Computer Vision* (ECCV '96), vol. 2, pp. 659–668 (Apr. 1996).

Wang, J.Y.A., and Adelson,E.H., "Representing Moving Images with Layers," *IEEE Transactions on Image Processing*, vol. 3, No. 5, pp. 625–638 (Sep. 1994).

Witkin, A.,and Kass,M., "Reaction–Diffusion Textures,", *Computer Graphics* (SIGGRAPH '91), vol. 25 No. 4, pp. 299–308 (Jul. 1991).

McMillan, L., and Bishop,G., "Head–Tracked Stereoscopic Display using Image Warping,", 1995 *IS&T/SPIE Symposium on Electronic Imaging Science and Technology*, SPIE Proc.s #2409A, San Jose, CA., 10 pages (Feb. 5–10, 1995).

DeBonet, J.S., "Multiresolution Sampling Procedure for Analysis and Synthesis of Texture Images," *Computer Graphics* (SIGGRAPH '97), pp. 361–368 (Aug. 1997).

(List continued on next page.)

Primary Examiner—Mark Zimmerman
Assistant Examiner—Hue Dung X. Cao
(74) Attorney, Agent, or Firm—Hamilton, Brook, Smith & Reynolds, P.C.

(57) ABSTRACT

A 3-D effect is added to a single image by adding depth to the single image. Depth can be added to the single image by selecting an arbitrary region or a number of pixels. A user interface simultaneously displays the single image and novel views of the single original image taken from virtual camera positions rotated relative to the original field of view. Depths given to the original image allow pixels to be reprojected onto the novel views to allow the user to observe the depth changes as they are being added. Functions are provided to edit gaps or voids generated in the process of adding depth to the single image. The gaps occur because of depth discontinuities between regions to which depth has been added and the voids are due to the uncovering of previously occluded surfaces in the original image.

30 Claims, 9 Drawing Sheets

OTHER PUBLICATIONS

Gortler, S.J., et al., "Rendering Layered Depth Images," Technical Report MSTR–TR–97–09, Microsoft Research, Microsoft Corp., pp. 1–10 (Mar. 1997).

Greene, N., and Heckbert, P., "Creating Raster Omnimax Images from Multiple Perspective Views using the Elliptical Weighted Average Filter," *IEEE Computer Graphics and Applications*, pp. 21–27 (Jun. 1986).

* cited by examiner

DEPTH PAINTING FOR 3-D RENDERING APPLICATIONS

BACKGROUND OF THE INVENTION

In the video and film industry, the animation process can take any number of various forms: conventional cel animation, the use of three dimensional ("3-D") models and effects and image-based rendering. Cel animation is the traditional method for generating animation by painting a foreground object on a sheet of clear celluloid (cel) and placing the cel on a background. The animation is generated by producing a series of cels with the foreground object moved to a new position in each cel. A 3-D model of an object is a representation that contains geometry information and surface attributes for a 3-D object in order to display the 3-D object on a 2-D display. The geometry information in the representation typically defines the surfaces of the 3-D object as a list of flat polygons sharing common sides and vertices. The surface attributes in the representation specify the texture and color to apply to the 3-D object. Both the generation of cels for cel animation and the generation of 3-D models are laborious and time consuming.

Image-based rendering techniques use 2-D images for visualizing in 3-D as well as editing and manipulating 3-D static scenes. The 3-D effects are generated through a rendering of a novel view of the 3-D static scene from another viewpoint by moving a virtual camera position. An image-based rendering technique for generating 3-D effects from a set of two-dimensional ("2-D") images of a 3-D static scene is described in Greene et al. "Creating raster Omnimax images from multiple perspective views using the Elliptical Weighted Average filter", IEEE Computer Graphics and Applications. pages 21–27, August 1995. An image based rendering technique such as described in Greene et al. requires a set of 2-D images from multiple perspective views of the 3-D static scene. The set of 2-D images is required to provide the 3-D geometric information to render novel views of the 3-D static scene.

Current image-based rendering techniques such as the technique described in Greene et al. may be used only when there is a set of 2-D images of the 3-D static scene available, to provide 3-D geometric information. However, there may be only a single 2-D image of a 3-D static scene, for example, a painting or a photograph or the single 2-D image may be an abstract painting with no depth. A technique to generate 3-D effects for a single 2-D image of a 3-D static scene is described in "Tour into the picture: Using a spidery mesh interface to make animation from a single image", by Horry et al. in Computer Graphics (SIGGRAPH'95), pages 229–238, August 1995. Horry et al. provides a user interface which allows the user to create 3-D effects from a single 2-D image. After the user has selected a vanishing point and distinguished foreground objects from background objects in the single 2-D image, a 3-D model is generated through the use of simple polygons and planar regions. Novel views of the single 2-D image are generated using the generated 3-D model of the single 2-D image.

SUMMARY OF THE INVENTION

An image taken from a new point of view may be rendered from an original two-dimensional image without a 3-D model using the present invention. Multiple-layers are defined by assigning depth to pixels in the original image, and pixels with depth are added to portions of layers covered by a foreground layer in the original image. Image locations of pixels from the original image and added pixels, which are reprojected to a new point of view, are calculated from the new point of view and dimensional information of the original image, including the assigned depth. The reprojected pixels are displayed at the calculated locations.

On a preferred and novel user interface, the original two-dimensional image and images from new points of view are simultaneously displayed during the rendering process. The original two-dimensional image may be centered within the images calculated for points of view left, right, up and down relative to the point of view of the original two-dimensional image.

Depth may be assigned to pixels in the two dimensional original image by designating regions and assigning depth to pixels within each region as a class. The depths of the pixels within a region may be assigned as a function of pixel position within the region. For example, the depth of a pixel may be proportional to its distance from a region boundary. The depths of pixels within a region may also be assigned as a function of pixel brightness in the region.

Depth may be assigned to a region such that the region is rotated relative to the original image. The resultant gaps between boundaries as viewed from new points of view may be filled by recomputing depths of pixels in adjacent regions to create smooth depth transitions between the region boundaries.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
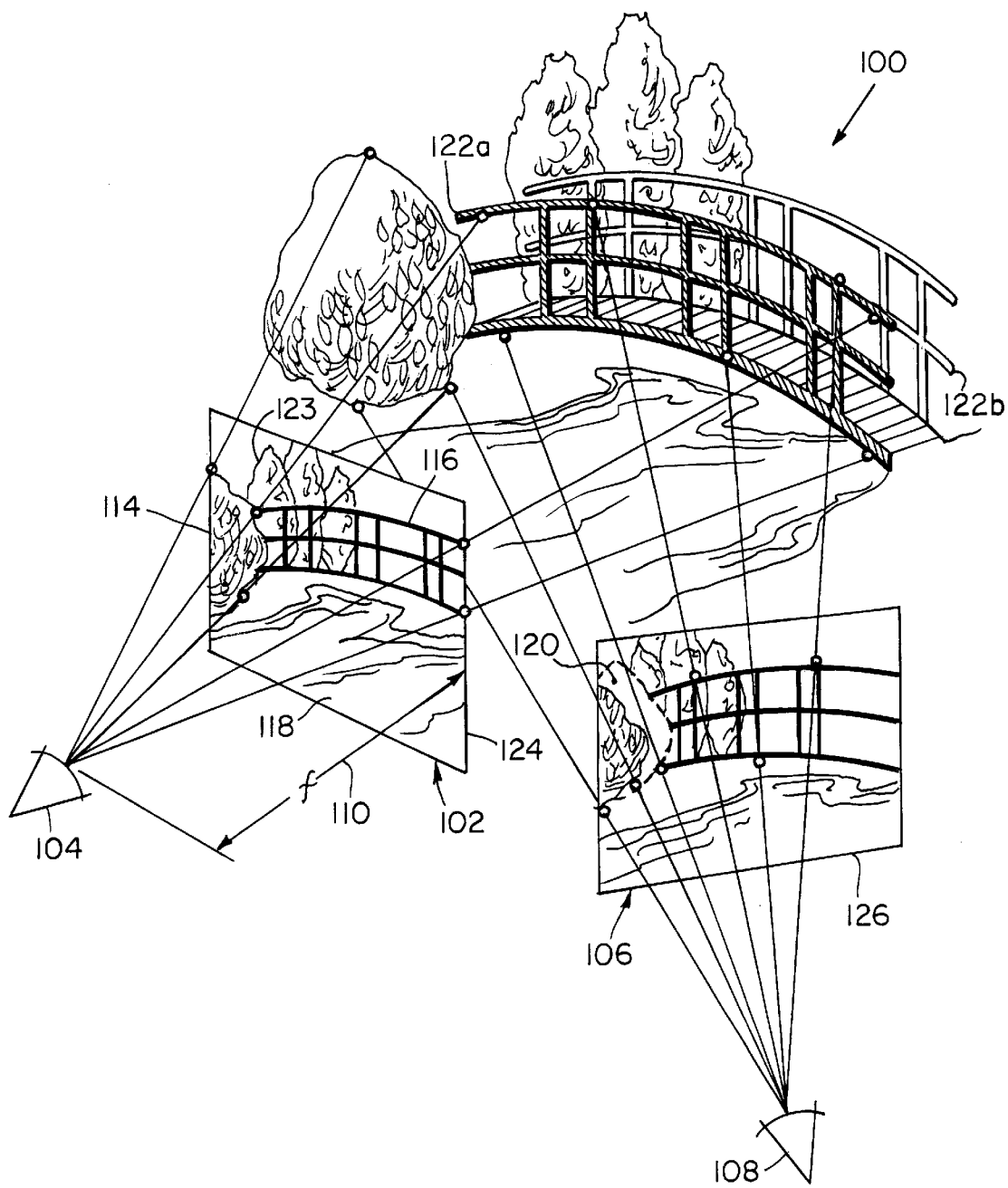
FIG. 1 is an illustration of a 3-D static scene and a single image of the 3-D static scene seen from a first virtual camera position and a novel view of the 3-D scene rendered from the single image seen from a second virtual camera position, according to the principles of the invention.

FIG. 1 illustrates a 3-D static scene 100, an original single image 102 of the 3-D static scene 100 taken from an original camera viewpoint 104 and a new image 106 of the 3-D static scene 100 from a first virtual camera viewpoint 108. The 3-D static scene 100 includes a bush 114, a bridge 116, water 118 under the bridge 116 and trees 123 in the background behind the bush 114. In the 3-D static scene 100 all boundaries of the bridge 116 and bush 114 and trees 123 located behind the bush are visible. The bridge 116 is shown extending from the bridge's left boundary 122a beside the bush to the bridge's right boundary 122b beyond the water 118.

The original single image 102 of the 3-D static scene 100 is produced by projecting the 3-D static scene 100 toward the original camera position 104 onto an image plane 124 at the camera focal length 110. The bridge's left boundary 122a, the bridge's right boundary 122b and the trees 123 behind the bush 114 in the 3-D static scene 100 are not seen in the original single image 102.

The new image 106 is a view of the 3-D static scene 100 from the first virtual camera viewpoint 108. Using the present invention, that image may be rendered when only the original single image 102 is available, that is, when there is no opportunity to image the scene directly as suggested in FIG. 1. The original single image 102 may also be an abstract painting for which there is no physical interpretation. Many of the pixels in the original single image 102 may be found in the new image 106 with some reorientation resulting from the different point of view. By making assumptions regarding length of the objects in the 3-D static scene 100 and the original focal length, calculations can be made to reproject those pixels onto the new image plane 126.

Unfortunately, not all pixels required in the new image 106 can be found in the original single image 102. For example, a void 120 is present between the bridge and the bush in the new image 106 because an area behind the bush 114 is uncovered. As shown in the 3-D static image 100 the area behind the bush 114 includes trees 123 and the bridge's left boundary 122a. The original single image 102 does not have information on what to project to the void 120 because the trees 123 and the bridge's left boundary 122a behind the bush 114 are not projected from the 3-D static image 100 onto the image plane 124.

To complete the new image 106, information for the area behind the bush is added to the original single image 102 and displayed in the new image 106. The new image 106 differs from the 3-D static image 100 because the actual information for what is behind the bush 114 is not provided in the original single image 104. For example, information added to the area behind the bush 114 in the original single image 102 may continue the bridge further than the bridge in the 3-D static image. A method for adding information for the void 120 displayed in the new image 106 is described in conjunction with FIG. 5.

Figure 2:
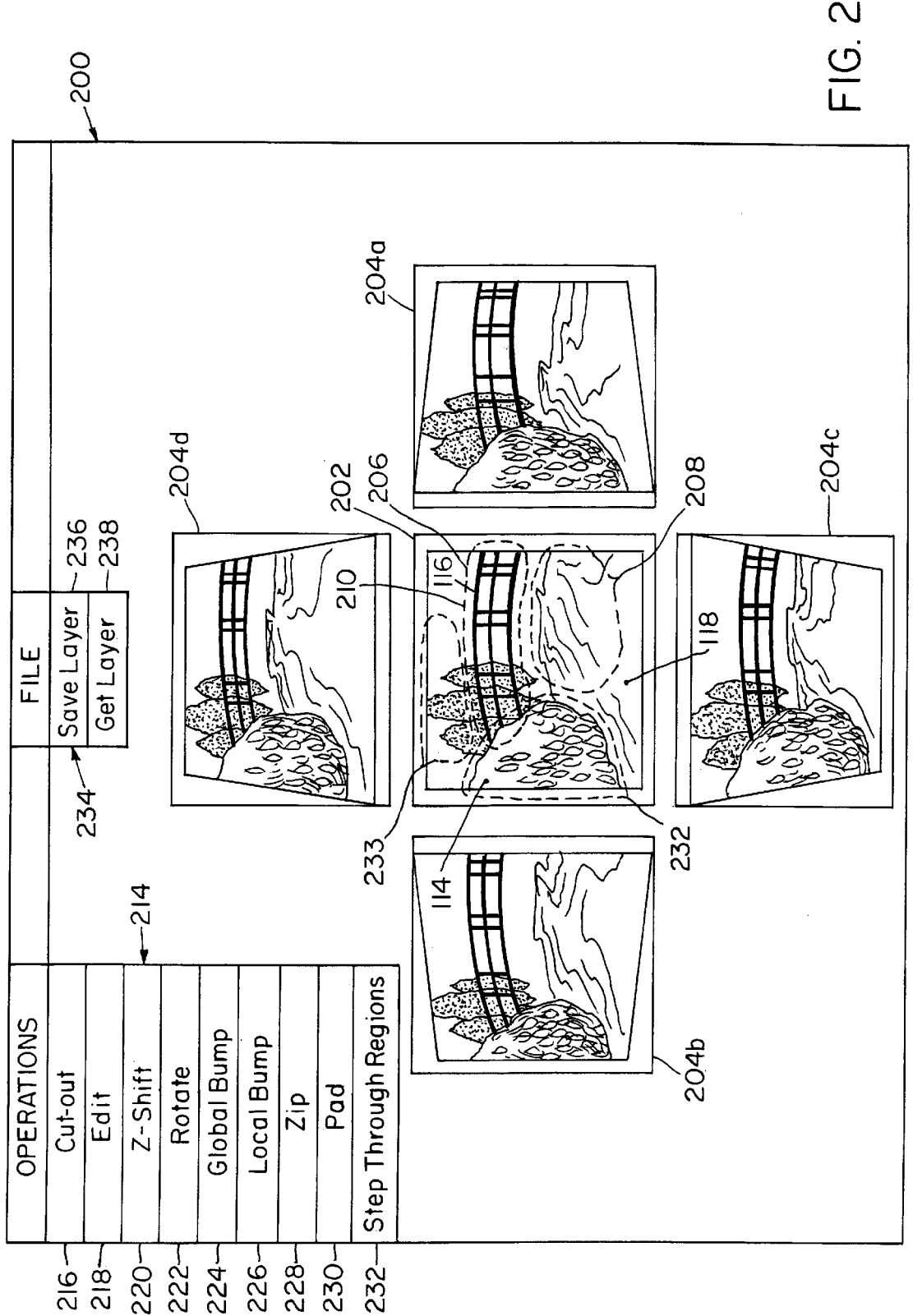
FIG. 2 is a user interface for displaying novel views of the single image shown in FIG. 1 from virtual camera positions, showing selected regions in the central view and region operations.

FIG. 2 illustrates an embodiment of a user interface 200 for displaying novel views of the original single image 102 shown in FIG. 1. The user interface 200 simultaneously displays a central view 202 and four auxiliary views 204a–d of the original single image 102 shown in FIG. 1. The original single image 102 is displayed in the central view 202. The central view 202 as shown, is a planar image, with a single depth and is displayed with the original camera viewpoint 104 in frontal parallel position. The four auxiliary views 204a–d correspond to left, right, top and bottom side views of the central view 202. The right image 204a corresponds to the virtual camera moving to the left and rotating to the right relative to the central view 202. The left image 204b corresponds to moving to the right and rotating to the left relative to the central view 202. The top image 204d corresponds to the virtual camera moving to the bottom and tilting to the top relative to the central view 202. The bottom image 204c corresponds to the virtual camera moving to the top and tilting to the bottom relative to the central view 202.

The actual angle of view to create the auxiliary views 204a–d may be system or user defined. The user interface 200 is not limited to the central view 202 and four auxiliary views 204a–d, any number of views may be displayed. For example, the system may only allow for one point of view rotation and only display one auxiliary view, for example, the night image 204a or the system may only allow for point of view rotation to left and right and only display two auxiliary views, the right image 204a and the left image 204b. The virtual camera viewpoint of the central view 202 may be manipulated at any time and camera parameters, such as focal length or field of view may be modified.

Figure 3:
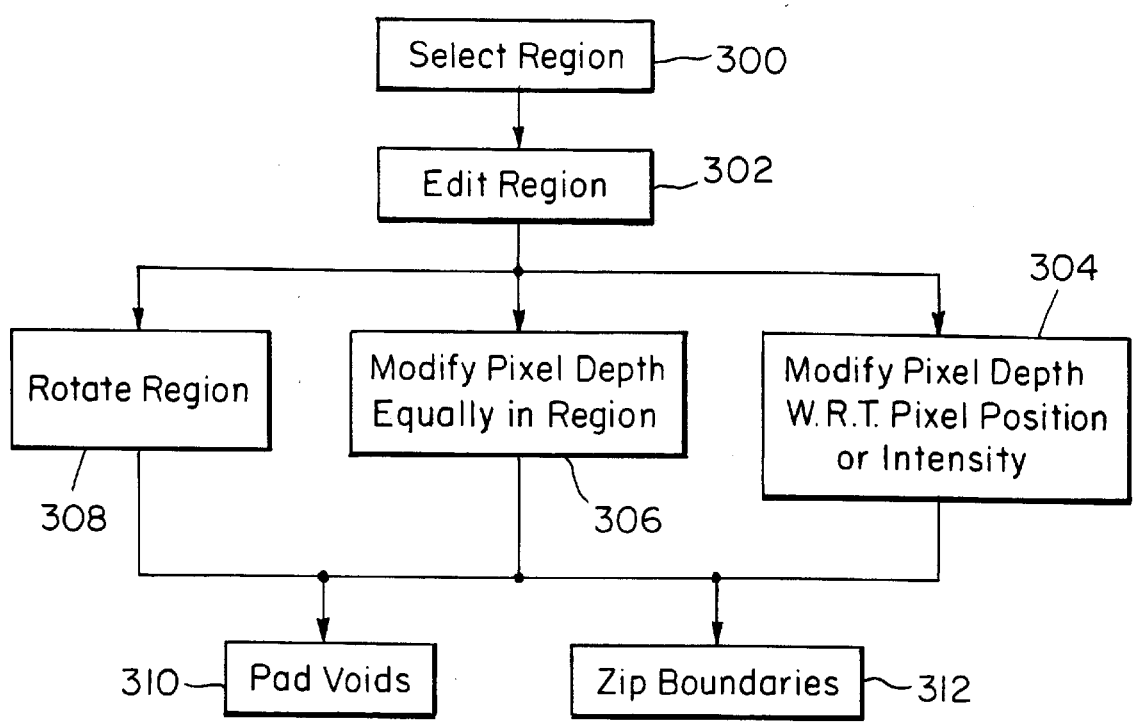
FIG. 3 is a flow graph illustrating a sequence of operations preformed on a region in the central view.

The central view 202 in FIG. 2 displays the single depth original single image 102 shown in FIG. 1. Depth may be assigned in the original single image 102 (FIG. 1) by modifying the depth of pixels in a region or layer selected in the central view 202. FIG. 3 illustrates the steps for assigning depth to pixels in a region in the central view 202. Depth is modified in the region by adding or subtracting depth to pixels in the region. Any change to the region in the original single image 102(FIG. 1) in the central view 202 is projected onto the novel views in the four auxiliary views 204a–d to facilitate visualization of the effect of the region modification in the central view 202.

In step 300 in FIG. 3 a region is selected by tracing freehand a region boundary around the region using an input device, such as a mouse or a pen. After the region boundary has been drawn the region may be cut out by selecting the region cut out operation 216 in the operations pull-down menu 214. In an alternative embodiment the region may be selected semi-automatically through techniques for interactive boundary extraction, such as using the method described by Mortensen et al. in "Intelligent scissors for image composition", Computer Graphics, (SIGGRAPH'95), pages 191–198, incorporated by reference herein. For example, in FIG. 2 a bridge region 206 has been selected in the central view 202 by tracing a bridge region boundary line 210 around the bridge. The bridge region 206 in the central view 202 includes the bridge 116 and an area outside the boundary of the bridge 116. A bush region 232, a water region 208, and a tree region 233 have also been selected in the central view 202.

In step 302 in FIG. 3 the selected region may be modified by adding or removing pixels from the region. For example, in FIG. 2 the bridge region 206 may be edited to remove the pixels outside the boundary of the bridge in the bridge region 206 to align the bridge region boundary 210 with the boundary of the bridge 116. To edit the bridge region 206 the region edit operation 218 is selected in the operation pull-down menu 214 in the user interface 200. The region edit operation 218 allows the modification of the bridge region boundary 210 in order to provide an accurate bridge region 206 from an inaccurate initial selection of the bridge region 206. An input device such as, a mouse or a pen is used to select the pixels to add to or remove from the bridge region 206.

Returning to FIG. 3, in step 304 depth may be assigned to pixels in the selected region by assigning depth to pixels in the region dependent on pixel position or pixel brightness in the region. In the case of a grey scale image pixel brightness is dependent on the intensity of the pixel, in the case of a color image pixel brightness is dependent on a weighted average of the red, green and blue intensity values. For example, in FIG. 2, to assign depth to the water region 208 the local bump operation 226 in the operation pull-down menu 214 is selected. Selecting the local bump operation 228 assigns depth to pixels in the water region 208 in proportion to a pixel's intensity. The local bump operation 226 is useful in modeling rough surfaces such as a wavy water region 208.

Selecting the global bump operation 224 assigns depth to pixels in a region in proportion to the pixel's distance from the region boundary. For example, by applying a global bump to the bush region 232, the 3-D shape of the bush 114 can be rounded. Pixels at the center of the bush region 232 will be given depths closer to the viewer than pixels near the edge of the boundary of the bush region 232. In the current embodiment the change in pixel depth is proportional to the square root of its distance to the region boundary. Other functions such as a gaussian or linear function may also be used in the global bump operation 224.

Returning to FIG. 3, in step 306 depth of pixels in a region may be assigned by assigning the same depth to all pixels in the region. For example, in FIG. 2 the same depth may be assigned to all pixels in the bridge region 206. To assign constant depth to all pixels in the bridge region 206, the global z-shift operation 220 in the operation pull-down menu 214 is selected. The global z-shift operation 220 adds depth to all pixels in the bridge region 206 or subtracts depth from all pixels in the bridge region 206 by the same amount throughout the bridge region 206. Similarly, a greater z-shift may be applied to the bush region 232.

Returning to FIG. 3, in step 308, depth may be assigned to pixels in a region by repeatedly rotating the region around the X-axis or the Y-axis by a fixed angle or by specifying an angle of rotation. For example, in FIG. 2 pixels in the water region 208 may be assigned depth by selecting the rotate operation 222 in the operation pull-down menu 214. The system operation can use personal knowledge that water is horizontal to rotate the original object about a horizontal axis, thus giving greater depth to pixels which are higher in the image. Note that the rotation of the original object does not change the central view 202 since it is assumed that the original single image 102 resulted from the assigned depths. However, the newly assigned depth information does affect the left view 204b, right view 204a top view 204d and bottom view 204c since those views are based on pixel reprojection calculations which rely on depth information. Rotation of a region about a vertical axis is based on an assumption that the original object was closer to the viewer at one end along the horizontal direction.

Figure 4:
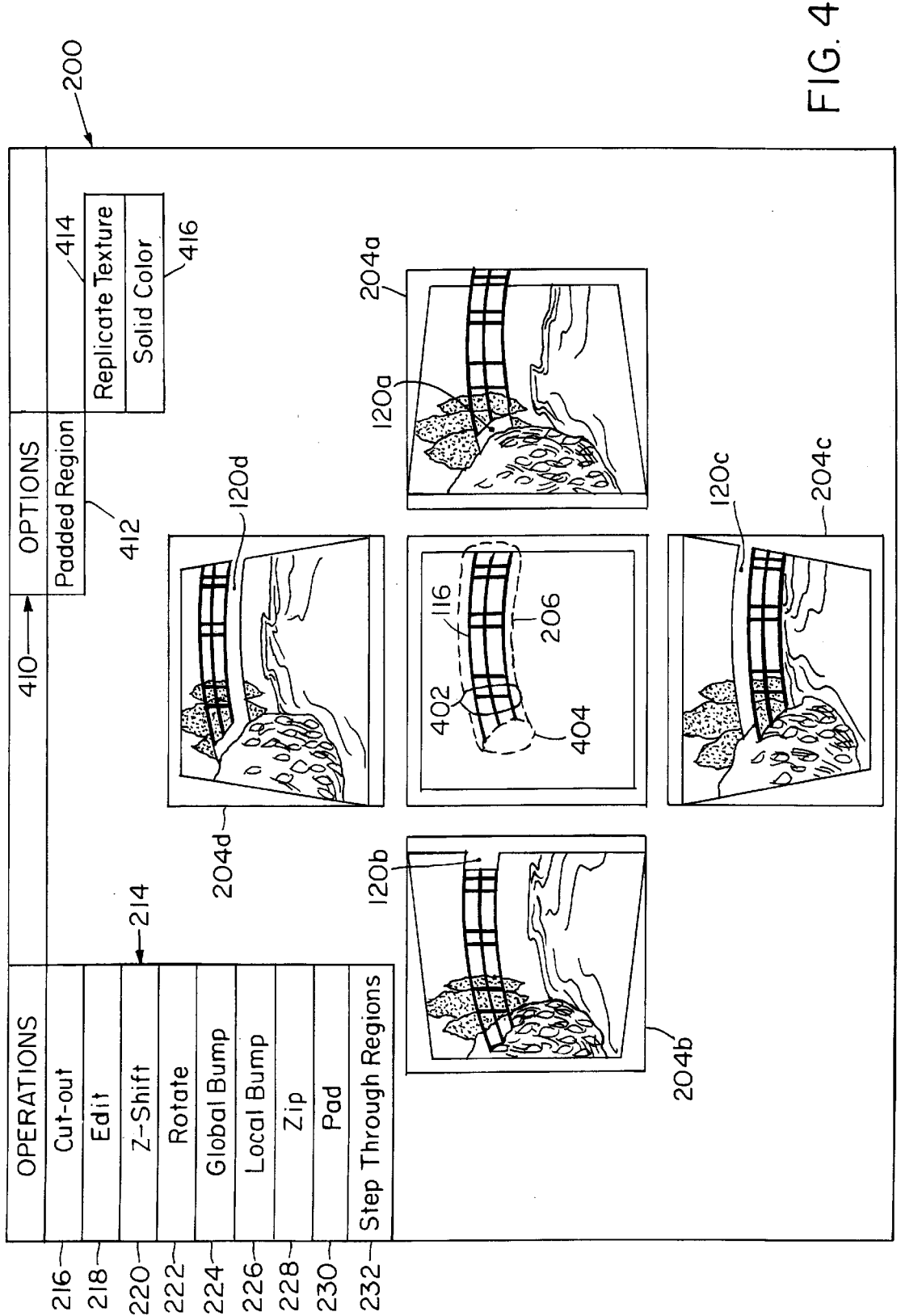
FIG. 4 illustrates the user interface displaying the result of adding depth to one of the regions selected in FIG. 2.

FIG. 4 illustrates the result of assigning depth change equally to all pixels in the bridge region 206 set back behind the bush 114 in the central view 202. The depth change in the bridge region 206 is projected onto the novel views in the four auxiliary views 204a–d. Voids 120a–120d occur in the novel views displayed in the auxiliary views 204a–d. Voids are empty pixels resulting from the lack of pixel information for the background in the 2-D original single image 102 (FIG. 1). A right void 120b occurs in the left view 204b between the bush 114 and the bridge 116 because information for the bridge's right boundary 122b (FIG. 1) in the 3-D static scene 100 (FIG. 1) is not provided in the original single image 102 (FIG. 1). In the right view 204a there is a left void 120a at the end of the bridge 116 because information for the bridge's left boundary 122a (FIG. 1) in the 3-D static scene 100 (FIG. 1) is not provided in the original single image 102 (FIG. 1); in effect, the viewer is looking behind the bush 114. In the bottom view 204c there is a top void 120c between the trees 123 and the top of the bridge 116, and in the top view 204d there is a bottom void 120d between the water 118 and the bottom of the bridge 116 because of the lack of information, such as intensity and color in the original single image 102 (FIG. 1).

Returning to FIG. 3, in step 310 pixel information, such as depth and texture for the empty pixels in the voids 120a–b in FIG. 4 may be added to the central view 202 in FIG. 4. Returning to FIG. 4, the information for the empty pixels in voids 120a–d is added outside the bridge region boundary 210 in the central view 202. To add information for the empty pixels in voids 120a–d, the pad operation 230 is selected in the operation pull-down menu 214. The pad operation 230 adds information for the empty pixels in the voids 120a–d using select and replicate functions. Copying the texture from a pixel in the central view 202 and applying the texture to an empty pixel in a void 120a–d is fast and easy to apply.

For example, to assign pixel information for the left void 120a in the right auxiliary view 204a, pixel texture and color information is added to the pixels in the background area 404 in the central view. To display the bridge 116 extending to the bush 118 in the left void 120a, the bridge region 206 is selected and highlighted in the central view 202. Pixels in the bridge area 402 of the bridge region 206 to be copied to the background area 404 are selected. The pixel information, such as color, is copied to selected pixels in the background area 404. As the color of the pixel selected in the bridge area 402 is copied to a pixel in the background area 404, a depth value is also assigned to the pixel in the background area. The depth value assigned is dependent on the average depth of the pixels selected and replicated, for example, if the number of pixels selected is 10×10 the average depth of the 100 pixels selected is assigned to the 100 pixels copied in the background area 400.

In an alternative embodiment the pixels in the voids 120a–d may be assigned texture and depth through the use of texture synthesis methods such as those described by DeBonet in "Multiresolution sampling procedure for analysis and synthesis of texture images", Computer Graphics (SIGGRAPH'97), pages 361–368, August 1997, or by Heeger et al. in "Pyramid-based texture analysis/synthesis", Computer Graphics (SIGGRAPH'95), pages 229–238, August 1995 or by Wilkin et al. "Reaction-diffusion textures", Computer Graphics (SIGGRAPH'91), 25(4):299–308, July 1991, all of which are incorporated herein by reference.

Figure 5A:
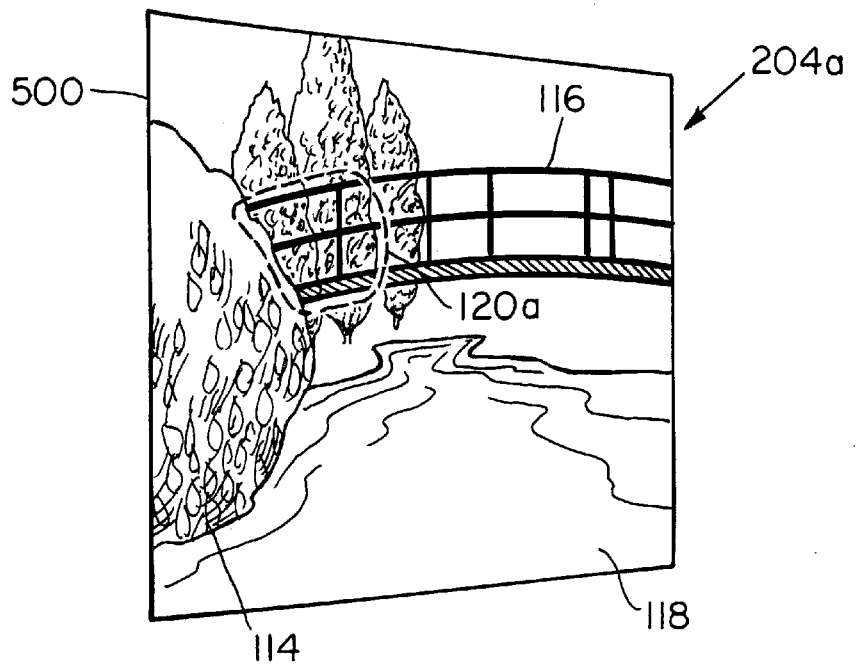
FIG. 5A illustrates the user interface displaying one result of adding pixel depth and texture information in one of the gaps shown in FIG. 4.
Figure 5B:
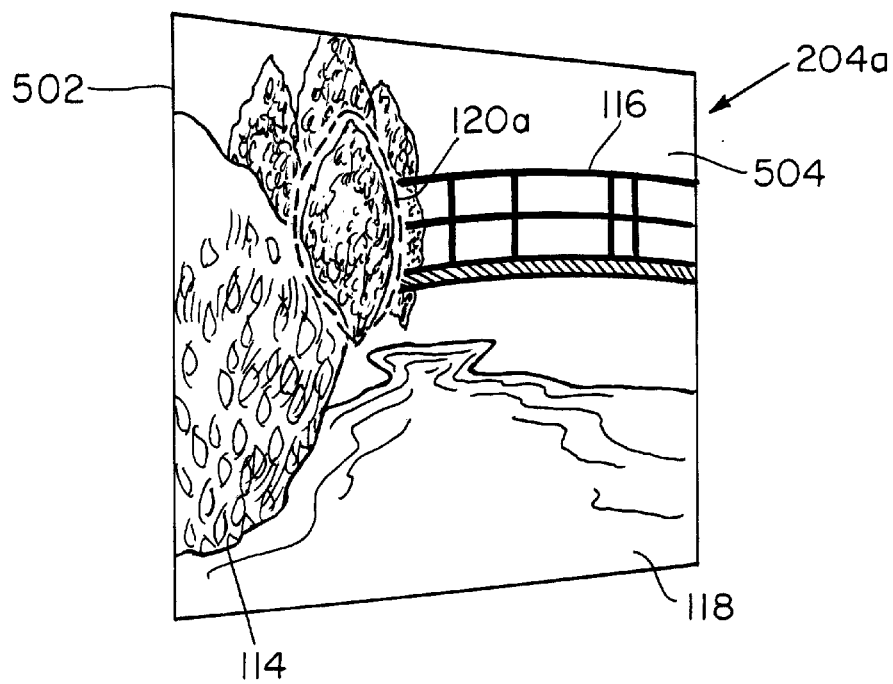
FIG. 5B illustrates the user interface displaying another result of adding pixel depth and texture information to one of the gaps shown in FIG. 4.

FIG. 5A illustrates the right view 204a after replicating the appearance of pixels in the bridge area 402 to pixels in the background area 404 by selecting and copying texture from pixels in the bridge area 402 to the pixels in the background area 404 in the central view 202 as described in conjunction with FIG. 4. FIG. 5B illustrates an alternative rendering of the right view 204a after selecting and highlighting the tree region 233 in the central view 202 and selecting and copying texture from pixels of trees in the tree region 233 (FIG. 2) to the pixels in the background area 404 (FIG. 4) in the central view 202. The novel view after padding shown in FIG. 5A represents the novel view as it would be seen from the 3-D static scene 100 (FIG. 1) but the novel view in FIG. 5B does not. However, both FIG. 5A and FIG. 5B provide a realistic rendering of a supposed original single image 102 (FIG. 1) without knowledge of the 3-D static scene 100 (FIG. 1).

Figure 6A:
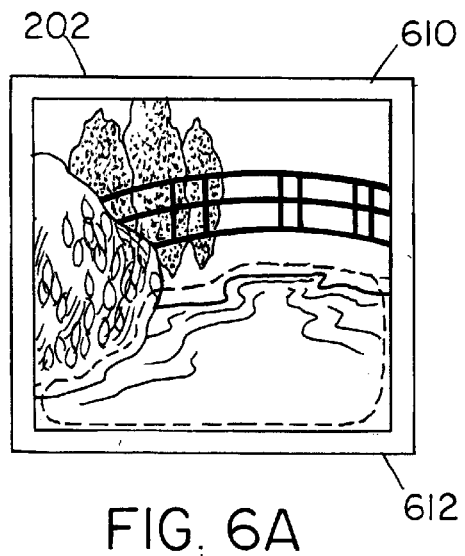
FIGS. 6A–C illustrate a depth discontinuity between adjacent image layers generated by manipulating a layer in the central view as seen from a virtual camera viewpoint in an auxiliary view.
Figure 6B:
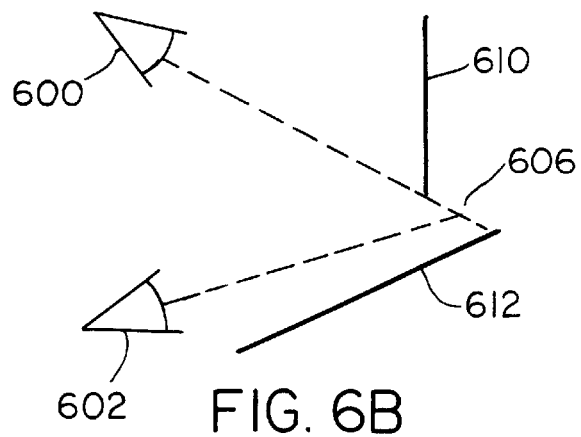
Figure 6C:
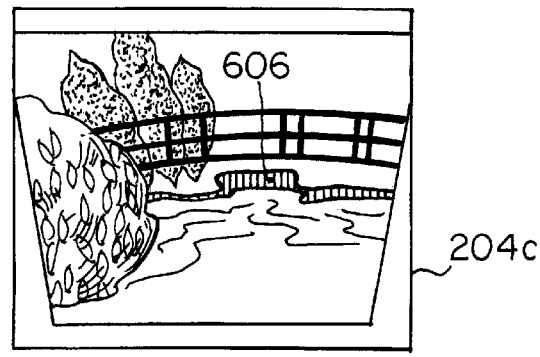

FIGS. 6A–C illustrate the creation of a gap between supposedly intersecting surfaces with rotation of one of the surfaces. In FIG. 6A the bottom region 612 and top region 610 are selected in the central view 202. As shown in FIG. 6B, the bottom region 612 is rotated relative to the top region 610 resulting in a depth discontinuity or gap 606 between the bottom region 612 and the top region 610 as seen from a virtual camera position 602. The gap 606 is displayed below the bridge 116 in the bottom view 204c in FIG. 6C. No gap is seen in the central view 202 in FIG. 6A observed from camera position 600.

Figure 7A:
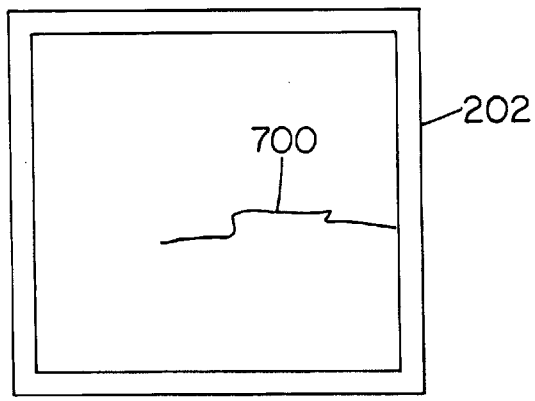
FIGS. 7A–C illustrate the operation of a zipping operation to remove the depth discontinuity shown in FIGS. 6A–C.
Figure 7B:
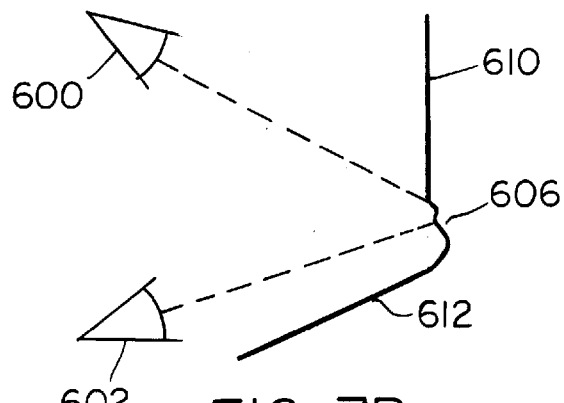
Figure 7C:
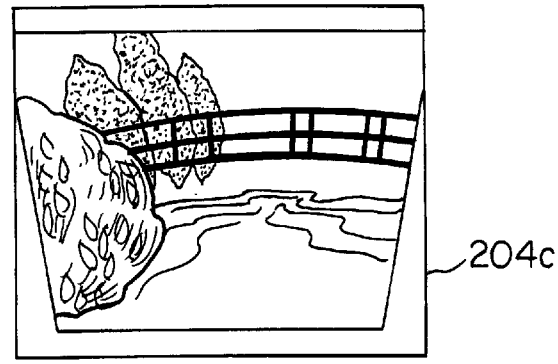

Returning to FIG. 3, in step 312 a gap visible between image layers at a virtual camera viewpoint may be zipped by modifying the depth of pixels in the gap so that the gap is no longer visible at any virtual camera viewpoint. FIGS. 7A–C illustrate the result of selecting the zip operation 228(FIG. 4) from the operation pull-down menu 214. All discontiguous boundaries between regions are displayed in the central view 202 in FIG. 7A. The gap 706 between the top region 610 and the bottom region 612 is represented by a line 700 displayed in the central view 202. The gap may be easily zipped by dragging an input device such as, a mouse or a pen along the line 700 in the central view 202. The depth of the pixels at the boundary of the top region 610 and the bottom region 612 close to the gap 606 are recalculated and reassigned as illustrated in FIG. 7B as the input device is dragged along the line 700. Depth is assigned to pixels in the bottom region 612 and the top region 610 so as to create a smooth depth transition between the bottom region 612 and the top region 610. After the depth of pixels in the gap 606 have been modified, the gap 606 is no longer visible in the bottom view 204c in FIG. 7C.

After depth has been modified in a region, the region may be saved as a scene layer or depth may be modified in other selected regions and a number of regions may be saved in a scene layer. A scene layer includes a region or regions to be added or removed from a scene. For example, a person standing on the bridge 116 in the original single image 102 may be selected as a region and stored in a separate scene layer to the bush region 232, bridge region 206, water region 208 and tree region 233 in order to provide a scene in which the person is no longer standing on the bridge 116. To save a scene layer the save layer operation 236 (FIG. 2) from the file pull-down menu 234 is selected. The storing of scene layers and regions in memory is discussed in conjunction with FIG. 9.

Figure 8:
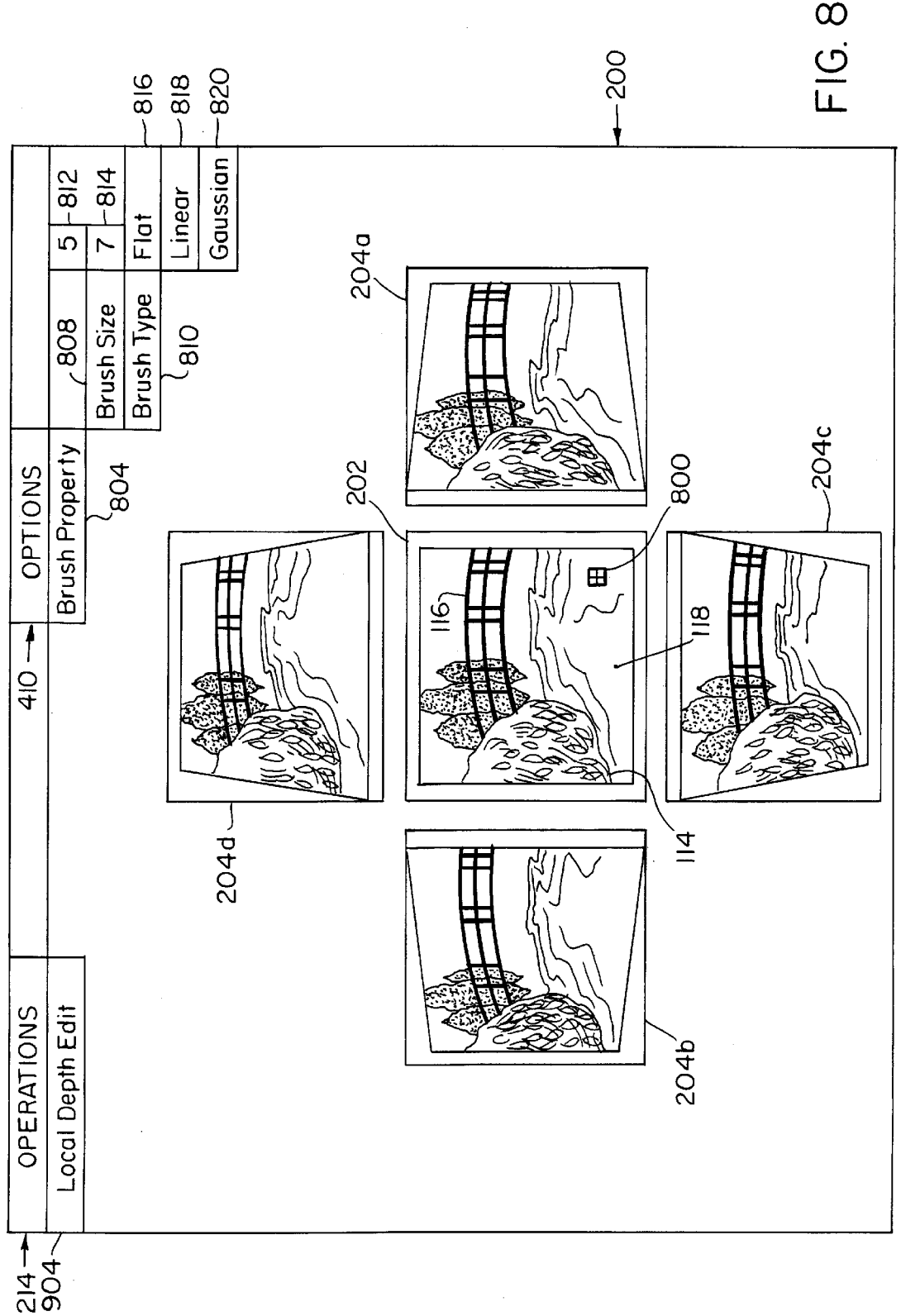
FIG. 8 illustrates the same user interface shown in FIG. 2 showing an area selected in the central view and the operations that may be performed on pixels in the selected area.

Depth may also be assigned locally to pixels in the central view 202. A local depth change may also be made within a selected region. FIG. 8 illustrates assigning depth to pixels within a local window 800 in the central view 202. Depth is assigned to pixels within the local window 800 through the use of an input device, for example, a mouse or a pen. Allowing depth to be assigned through the use of a local window 800 to the original single image 102 (FIG. 1), displayed in the central view 202, allows depth to be assigned in an intuitive way, similar to the way that painter's paint a picture. The local window or brush footprint parameters may be modified by selecting the brush property operation 804 in the options pull-down menu 410 in the user interface 200. The brush property operation 804 allows the selection of the brush size 808 by specifying the exact number of pixels in the local window 800, for example, a 5×5 pixels brush footprint 812 or a 7×7 pixels brush footprint 814. Depth can be changed one pixel at a time by selecting a 1×1 pixel brush footprint. The selection of the number of pixels in the local window 800 is similar to the selection of the thickness of a painter's brush. The brush property operation 804 also allows the selection of the brush type 810 to be flat 816, linear 818 or gaussian 820.

The method of assigning depth change is selected through the use of the local depth edit 804 operation in the operations pull-down menu 214. To assign depth the local window 800 is moved to a location in the central view 202 by moving the input device. Pixels within the local window 800 are assigned depth dependent on the brush property 804 selected in the operations pull-down menu 214.

If constant change depth distribution is selected by selecting a flat brush type 816, depths for all pixels within the local window 800 are changed by the same amount. If bilinear change depth distribution is selected by selecting the linear brush type 818, depths for the pixels within the local window 800 are modified as follows: the pixels along the center of the local window 800 have the greatest depth added or subtracted and the depth added or subtracted tapers off steeply in each pixel of the local window 800 towards the outer boundaries of the local window 800. If gaussian depth change distribution is selected by selecting a gaussian brush type 820, depths for the pixels within the local window 800 are changed as follows: the pixels in the center have the greatest depth added or subtracted and the depth added or subtracted tapers off in the shape of a symmetrical bell-shaped curve towards the outer boundaries of the local window 800.

In alternate embodiments the depth of pixels may also be changed by selecting a 3-D template such as, a cube, a cylinder, or an ellipsoid sphere, or selecting a 3-D specialized shape such as a face.

Appearance of pixels within the local window 800 may be changed, for example, by adding texture to a pixel by replicating the texture of another pixel in the central view 202 or by selecting a solid color to add to a pixel.

Figure 9:
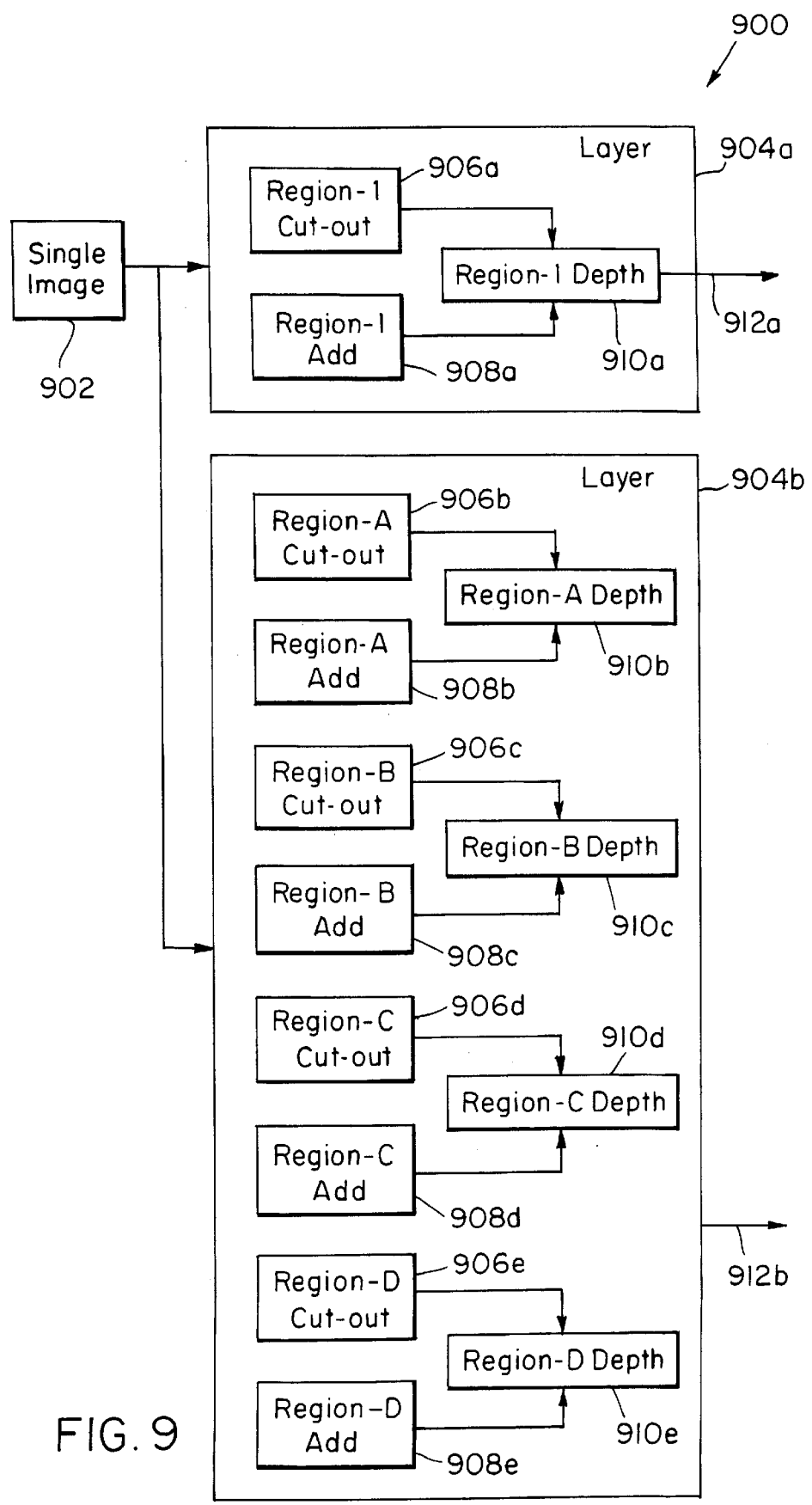
FIG. 9 is a block diagram illustrating the storage of the original single image and created image layers in a computer's memory.

FIG. 9 illustrates the storage in computer memory 900 of the original single image 902 and scene layers 204a–b generated from the original single image 102 (FIG. 1). Local depth changes made within the local window 800 described in conjunction with FIG. 8 are stored in the single image 902. Region depth changes are stored in scene layers 204a–b. The scene layers 204a–b store the selection, pixel information added and depth assignments regions made to pixels in regions selected, edited and modified in the central view 202 (FIG. 2) The number of scene layers 204a–b stored in memory is dependent on the number of scene layers saved using the save layer operation 236 in the file pull-down menu 234 in the user interface 200.

For example, an object such as a person sitting on the bridge, or a shark in the water may be stored in the first scene layer 204a. The object is stored in a separate scene layer 904 to allow the creation of scenes with or without the object. The original pixel information for the object is stored in Region-1 Cut-out 906a in the first scene layer 204a. Padding added to the object through the pad operation 230 in the operations pull-down menu 214 is stored in Region-1 Add 908a in the first scene layer 204a. Depth information added to the object is stored in Region-1 Depth 810a in the first scene layer 204a.

The bridge region 206, the water region 208, the bush region 232 and the tree region 233 selected from the original single image 102 may be stored in the same scene layer, for example, in the second scene layer 904b. The original bridge region 206 is stored in Region-A Cut-out 906b. The original water region 208 is stored in Region-B Cut-out 906c. The original bush region 232 is stored in Region-C Cut-out 906d. The original tree region 233 is stored in Region-D Cut-out 906e.

Addition to pixel information to pixels in one of the regions 906b–e in the second scene layer 904b, for example, the bush region 232, as a result of a pad operation 230 are stored in Region-A Add 908b in the second scene layer 904b. Depth assignments to pixels in the bush region 232 are stored in Region-A Depth 910b.

To display the layers on an output device, such as a monitor, the second scene layers's output 912b is merged with the first scene layer's output 912a. Image rendering techniques for pixel resampling are applied to the output in order to perform the pixel transfer computation and display the scene layers 204a–b correctly oil the output device. The image rendering techniques used for pixel resampling include the painter's algorithm and pixel interpolation.

The painter's algorithm ensures that pixels are transferred in the correct order so that the nearer objects of an image occlude the more distant objects in the image. The painter's algorithm is described by McMillan et al. in "Head-tracked stereoscopic display using image warping", SPIE Symposium on Electronic Imaging Science, San Jose, Calif., February 1995, incorporated by reference herein.

The painter's algorithm first computes the projection of the center of the virtual camera in the central view 202. If the virtual camera center is in front of the center of the camera corresponding to the central view 202, then scanning for the auxiliary views 204a–d proceeds from the outer portions of the central view 202 towards the projected camera center. Otherwise, scanning for the auxiliary views 204a–d proceeds from the projected virtual camera center outwards to the outer portions of the central view 202.

When producing a novel view in the auxiliary views 204a–d voids within regions may result from mapping smaller patches from the original single image 102 to larger areas in the auxiliary views 204a–d. For example, in FIG. 2 projecting the result of reducing the focal length of the virtual camera position increases the size of the bridge region 206 in the auxiliary views 204a–d. Functional extrapolation such as, pixel interpolation techniques may be used to remove voids within regions. One method for performing the pixel interpolation is described in Green et al., "Creating raster Omnimax images from multiple perspective views using the Elliptical Weighted Average Filter", IEEE Computer Graphics and Applications, pages 21–27, June 1986 incorporated herein by reference. Functional extrapolation may also be used to add pixel information and depth to pixels located in voids at the edge of a region. Functional extrapolation adds pixel information to pixels in voids at the edge of regions and within regions by adding texture or color and deriving depth.

The pixel transfer computation time may be decreased by separating the computation along a scanline into common and differential components. An algorithm to perform a pixel transfer computation from an arbitrary 3-D point is described below:

$$p' = Rp + t = \begin{pmatrix} r_{00} & r_{01} & r_{02} \\ r_{10} & r_{11} & r_{12} \\ r_{20} & r_{21} & r_{22} \end{pmatrix} p + \begin{pmatrix} t_x \\ t_y \\ t_z \end{pmatrix} \quad (1)$$

where:
  p is an arbitrary point in 3-D space
  t is a translation vector with elements $t_x$, $t_y$, $t_z$
  p' is the transformed position of p
  R is a rotation matrix with elements $r_{00} \ldots , r_{22}$
Since $$p = \begin{pmatrix} \frac{z_{uv}}{f} u \\ \frac{z_{uv}}{f} v \\ z_{uv} \end{pmatrix} = z_{uv} \begin{pmatrix} \frac{1}{f} u \\ \frac{1}{f} v \\ 1 \end{pmatrix} \quad (2)$$

where:
  (u, v) is the projected 2-D co-ordinates on the image corresponding to p
  f is the camera focal length
  $Z_{uv}$ is the z-component (depth) of p corresponding to a projected point (u, v)
So, after substituting equation 2 in equation 1 and dividing by $Z_{uv}$ $$p' \equiv \begin{pmatrix} \frac{1}{f} u' \\ \frac{1}{f} v' \\ 1 \end{pmatrix} \equiv \begin{pmatrix} r_{00} & r_{01} & r_{02} \\ r_{10} & r_{11} & r_{12} \\ r_{20} & r_{21} & r_{22} \end{pmatrix} \begin{pmatrix} \frac{1}{f} u \\ \frac{1}{f} v \\ 1 \end{pmatrix} + \frac{1}{z_{uv}} \begin{pmatrix} t_x \\ t_y \\ t_z \end{pmatrix} \quad (3)$$

Multiplying by f and performing matrix multiplication results in the recomputation equation for the scanline.

$$\begin{pmatrix} u' \\ v' \\ 1 \end{pmatrix} \equiv \begin{pmatrix} r_{00} & r_{01} & fr_{02} \\ r_{10} & r_{11} & fr_{12} \\ \frac{1}{f} r_{20} & \frac{1}{f} r_{21} & r_{22} \end{pmatrix} \begin{pmatrix} u \\ v \\ 1 \end{pmatrix} + \frac{1}{z_{uv}} \begin{pmatrix} ft_x \\ ft_y \\ t_x \end{pmatrix} = \quad (4)$$

$$R_f \begin{pmatrix} u \\ v \\ 1 \end{pmatrix} + \frac{1}{z_{uv}} t_f = v_f(u_1 v) + \frac{1}{z_{uv}} t_f$$

If we step by k along the u-axis of the image (scanline), we get $$\begin{pmatrix} u'' \\ v'' \\ 1 \end{pmatrix} \equiv R_f \begin{pmatrix} u+k \\ v \\ 1 \end{pmatrix} + \frac{1}{z_{u-kv}} t_f = v_f(u, v) + k\delta v_f + \frac{1}{z_u + k_1 v} t_f \quad (5)$$

where $$\delta v_f = \begin{pmatrix} r_{00} \\ r_{10} \\ \frac{1}{f} r_{20} \end{pmatrix} \quad (6)$$

In another embodiment after assigning depth to pixels the user may add a radiosity value to pixels in the original single image 102(FIG. 1) to add shading dependent on the direction of the light source and the assigned depth. By controlling the light source direction, the user may change the appearance of a original single image 102 (FIG. 1) at a given virtual camera position 104 (FIG. 1).

Figure 10:
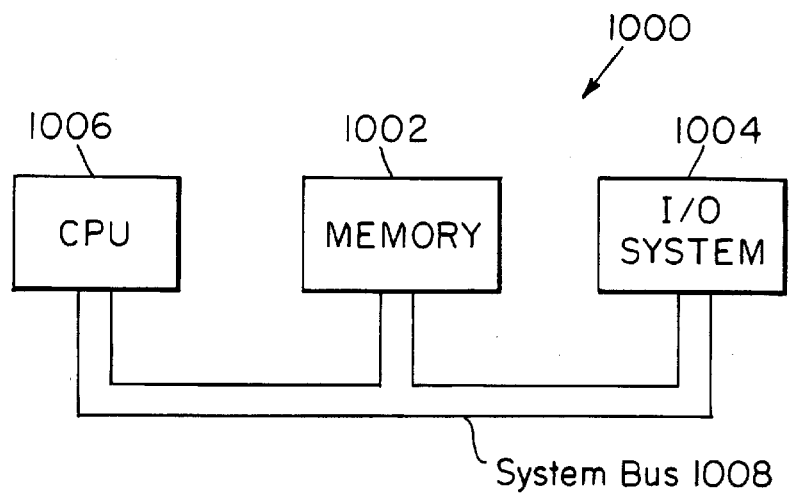
FIG. 10 illustrates a computer system in which the present invention may be used.

FIG. 10 illustrates a computer 1000 including a CPU 1006, memory 1002 and an I/O system 1004 connected through a system bus 1008. The I/O system 1004 provides control logic for an input device, for example, a mouse or a pen and control logic for an output device, for example, a monitor. The single image 902 and a rendering routine for rendering an image taken from a new point of view from the single image 902 according to the principles of the present invention are stored in memory 1002.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

The present invention allows users to assign depths to single images in an intuitive manner, similar to the way that painters paint. The user interface displays the original 2-D static image and auxiliary side views. The auxiliary side views allow the user to observe depth changes performed on the original 2-D static image. Arbitrary shapes may be designated in order to add depth to a region. The resulting image with depth allows rendering the static scene at novel camera viewpoints in a geometrically-correct manner. The user may also add pixel information to regions within the image so as to remove voids or gaps when viewed at novel camera viewpoints. The method to add pixel information allows the user to select the color and texture to add to the pixels. Image based rendering is used to create the novel viewpoints, therefore no 3-D models are explicitly created. The depth painting system may be used to generate scene layers from an original single image. These scene layers may then be used in any image-based rendering system such as that described in U.S. Patent Application Ser. No. 09/039,022 entitled "Multi-layer Image-Based Rendering For Video Synthesis", by Kang et al. filed on Mar. 13, 1998 incorporated herein by reference. Its results can also be used in conventional 3-D model based rendering. These layers can also be also be converted to 3-D model representations for viewing and manipulation in conventional 3-D model-based rendering systems such as CAD modeling systems.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of rendering, from a single original two dimensional image of a single field of view taken from a single point of view, an image taken from a new point of view, the method comprising:
   assigning non-computed depth to pixels in the two dimensional image of the single field of view taken from the single point of view, the two dimensional image including a foreground object;
   adding non-imaged pixels with depth to a portion of a layer which is covered by the foreground object in the original image;
   from the new point of view and dimensional information of the original image, including the assigned depth, calculating image locations of pixels from the original image and added pixels which are reprojected to the new point of view; and
   displaying the reprojected pixels at the calculated locations.

2. A method as claimed in claim 1, further comprising simultaneously displaying the original two-dimensional image and an image from a new point of view during the rendering process.

3. A method as claimed in claim 2, wherein the original image and an image calculated for another point of view relative to the point of view of the original image are displayed.

4. A method as claimed in claim 2, wherein the original image is between images calculated for points of view left and right relative to the point of view of the original image.

5. A method as claimed in claim 2 wherein the original image is centered within images calculated for points of view, left, right, up and down relative to the point of view of the original image.

6. A method as claimed in claim 1 wherein the step of assigning depths includes designating regions of the original image and assigning depths to pixels within each region as a class.

7. A method as claimed in claim 6 wherein the depths of the pixels within a region are assigned as a function of pixel position within the region.

8. A method as claimed in claim 7 wherein the depth of a pixel is proportional to its distance from a region boundary.

9. A method as claimed in claim 6 wherein depths of pixels within a region are assigned as a function of pixel brightness.

10. A method as claimed in claim 6 wherein depths of pixels within a region are assigned based on a predefined template.

11. A method as claimed in claim 6 further comprising the step of recomputing depths of pixels in adjacent regions to create a smooth depth transition between the boundaries.

12. A method as claimed in claim 6 wherein the step of assigning depths includes assigning depths to a region such that the region is rotated relative to the original image plane.

13. A method as claimed in claim 1, wherein the step of assigning depth includes assigning depth within a local window.

14. A method as claimed in claim 1, wherein the step of adding pixels with depth comprises adding regions by replicating appearance and deriving depth through functional extrapolation.

15. A computer program product for rendering, from a single original two dimensional image of a single field of view taken from a single point of view, an image taken from a new point of view, the computer program product comprising a computer usable medium having computer readable program code thereon, including program code which:
   assigns depth to pixels in the two dimensional image of the single field of view taken from the single point of view to define multiple layers, the two dimensional image includes a foreground object;
   paints a portion of a layer which is covered by the foreground layer in the original image;
   from the new point of view and dimensional information of the original image, including the assigned depth, calculates image locations of pixels from the original image and painted portions which are reprojected to the new point of view; and
   displays the reprojected pixels at the calculated locations.

16. A computer program product as claimed in claim 15 wherein the program code simultaneously displays the original two-dimensional image and an image from a new point of view during the rendering.

17. A computer program product as claimed in claim 16 wherein the program code displays the original image between images calculated for points of view left and right relative to the point of view of the original image.

18. A computer program product as claimed in claim 15 wherein the program code displays the original image between images calculated for points of view left, right, up and down relative to the point of view of the original image.

19. A computer program product as claimed in claim 18 wherein the program code assigns depths including designating regions of the original image and assigns depths to pixels within each region as a class.

20. A computer program product as claimed in claim 19 wherein the program code assigns the depths of the pixels within a region as a function of pixel position within the region.

21. A computer program product as claimed in claim 18 wherein the program code assigns depth of a pixel in proportional to its distance from a region boundary.

22. A computer program product as claimed in claim 18 wherein the program code assigns depths of pixels within a region as a function of pixel brightness.

23. A computer program product as claimed in claim 18 wherein the program code further comprises the step of recomputing depths of pixels in adjacent regions to create a smooth depth transition between the boundaries.

24. A computer program product as claimed in claim 18 wherein the program code assigns depths to a region such that the region is rotated relative to the original image plane.

25. An apparatus for rendering, from a single original two dimensional image of a single field of view taken from a single point of view, an image taken from a new point of view, comprising:
   a rendering routine;
   means, within the rendering routine, for assigning depth to pixels in the two dimensional image of the single field of view taken from the single point of view to define multiple layers, the two dimensional image including a foreground object;
   means, within the rendering routine, for painting a portion of a layer which is covered by the foreground object in the original image;
   means, within the rendering routine, from the new point of view and dimensional information of the original image, including the assigned depth, for calculating image locations of pixels from the original image and painted portions which are reprojected to the new point of view; and
   means, within the rendering routine, for displaying the reprojected pixels at the calculated locations.

26. An apparatus as claimed in claim 25 further comprising means, within the rendering routine for simultaneously displaying the original two-dimensional image and an image from a new point of view during the rendering, process.

27. An apparatus as claimed in claim 25 further comprising means, within the rendering routine, for simultaneously displaying the original two-dimensional image between images calculated for points of view left and right relative the point of view of the original image.

28. A computer system comprising:
   a central processing unit connected to a memory system by a system bus;
   an I/O system, connected to the system bus by a bus interface;
   a rendering routine located in the memory system responsive to a request for rendering, from a single original two dimensional image of a single field of view taken from a single point of view, an image taken from a new point of view;
   means, within the rendering routine for assigning depth to pixels in the two dimensional image, the two dimensional image including a foreground object;
   means, within the rendering routine for adding non-imaged pixels with depth to a portion of a layer which is covered by the foreground object in the original image;
   means, within the rendering routine from the new point of view and dimensional information of the original image, including the assigned depth, for calculating image locations of pixels from the original image and added pixels which are reprojected to the new point of view; and
   means within the rendering routine for displaying the reprojected pixels at the calculated locations.

29. A rendering routine which:
   assigns depth to pixels in a single two dimensional image of the single field of view taken from the single point of view, the two dimensional image including a foreground object;
   adds non-imaged pixels with depth to a portion of a layer which is covered by the foreground object in the original image;
   from a new point of view and dimensional information of the original image, including the assigned depth, calculates image locations of pixels from the original image and added pixels which are reprojected to the new point of view; and
   displays the reprojected pixels at the calculated locations.

30. A computer system comprising:
   a central processing unit connected to a memory system by a system bus;
   an I/O system, connected to the system bus by a bus interface; and
   a rendering routine located in the memory system responsive to a request for rendering, from a single original two dimensional image of a single field of view taken from a single point of view, an image taken from a new point of view which:
   assigns depth to pixels in the two dimensional image, the two dimensional image including a foreground object;
   adds non-imaged pixels with depth to a portion of a layer which is covered by the foreground object in the original image;
   from a new point of view and dimensional information of the original image, including the assigned depth, calculates image locations of pixels from the original image and added pixels which are reprojected to the new point of view; and
   displays the reprojected pixels at the calculated locations.

* * * * *